United States Patent [19]
Cabahug

[11] Patent Number: 5,788,443
[45] Date of Patent: Aug. 4, 1998

[54] MALE COUPLING WITH MOVABLE THREADED SEGMENTS

[75] Inventor: Eric F. Cabahug, Falls Church, Va.

[73] Assignee: Thread Technology, Inc., Sterling, Va.

[21] Appl. No.: 816,879

[22] Filed: Mar. 13, 1997

[51] Int. Cl.⁶ .................... F16B 35/02; F16L 35/00
[52] U.S. Cl. .................. 411/385; 411/354; 285/34
[58] Field of Search ............... 285/34, 35; 411/385, 411/390, 354, 433, 272

[56] References Cited

U.S. PATENT DOCUMENTS

| | | | |
|---|---|---|---|
| 644,366 | 2/1900 | Newell | 411/385 X |
| 2,644,524 | 7/1953 | Baker | 285/34 |
| 3,757,836 | 9/1973 | Masuda | 285/35 X |
| 4,478,546 | 10/1984 | Mercer | 411/385 |
| 5,160,172 | 11/1992 | Gariepy | 285/34 X |

*Primary Examiner*—Neill R. Wilson
*Attorney, Agent, or Firm*—Staas & Halsey

[57] ABSTRACT

A male coupling with movable threaded segments, consisting of a shaft, a sleeve mounted to move along the shaft, a plurality of threaded segments surrounding the shaft and mounted to move inwardly and outwardly relative to the shaft to effectively vary the outer diameter of the assembled threaded segments, the sleeve and threaded segments including surfaces adjoining each other such that movement of the sleeve in one direction causes the threaded segments to move inwardly toward the shaft, and a spring resiliently urging the threaded segments outward.

14 Claims, 4 Drawing Sheets

FIG. 3
FIG. 4
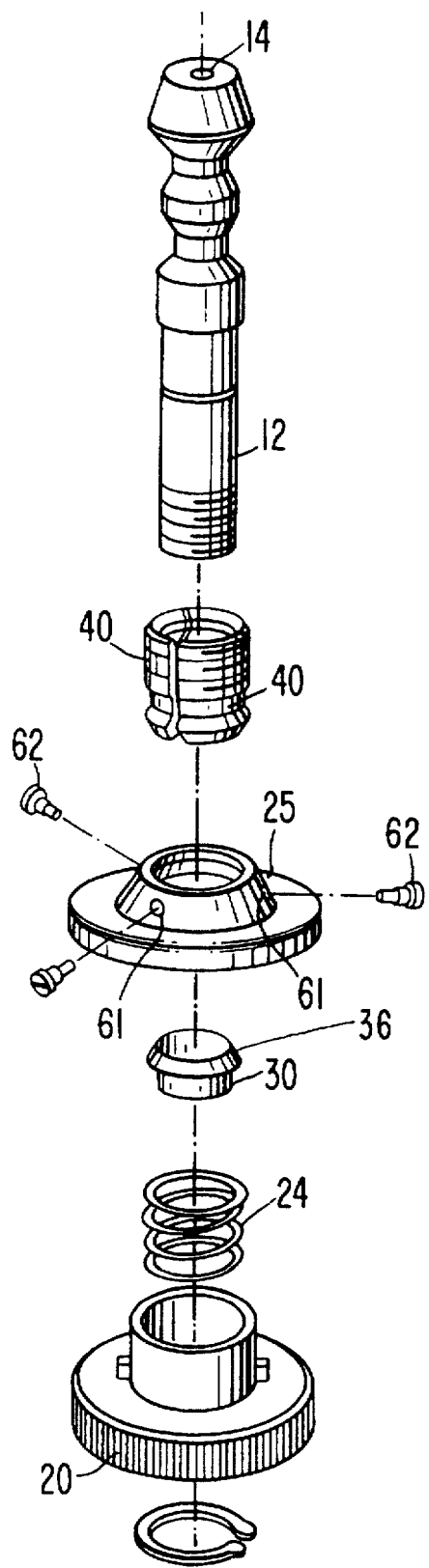
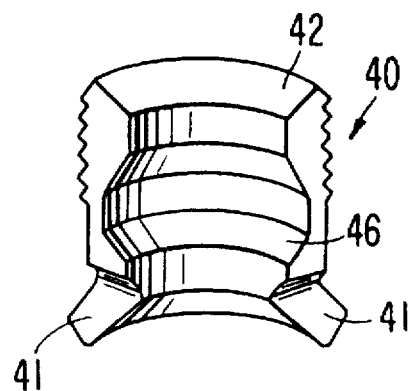

MALE COUPLING WITH MOVABLE THREADED SEGMENTS

BACKGROUND AND SUMMARY OF INVENTION

The present invention relates to a male coupling device featuring movably mounted threaded members which are capable of rapid engagement and disengagement with respect to the stationary threads of a female coupling device.

In U.S. Pat. Nos. 4,378,187; 5,324,150 and 5,427,488 there are disclosed threaded coupling devices which may be assembled by rapid rectilinear movement. Threaded coupling devices, such as nuts and bolts, may be ineffective in highly specialized applications where speed is required or where extended, rotating movement is undesirable. The threaded fasteners disclosed in these patents include within the female coupling device a plurality of radially extending, arcuate threaded segments normally positioned to engage the stationary threads of the male coupling member, but which may be retracted to permit the male coupling device to be inserted within the female coupling device by sliding movement.

In U.S. Pat. No. 5,378,100 there is disclosed a coupling device which may be both assembled and disassembled by rapid rectilinear movement. In common with the above patented coupling devices, the male member is provided with conventional threads while the female member is provided with threaded elements which are movably mounted such that as the male member is inserted within the female member the movably mounted threaded elements are moved radially outward permitting the male member to be moved inwardly by sliding or rectilinear movement. In addition, structure is provided permitting the movably mounted threaded elements to move radially outward permitting the male member to be removed from the female member by axial sliding or rectilinear movement.

In applications where the female coupling is required to have conventional, i.e., non-movable, threads, such as in compressed gas valves and related fittings and in standard bolting fittings, an adaptor unit could conceivably be used so as to permit the use of a female coupling member containing movably mounted threaded elements as disclosed in the above patents. However, in accordance with the present invention, it has been determined that it is possible to incorporate the movably mounted threaded elements within the male coupling member. With the present invention, either locking, or locking and unlocking, by axial movement of the male coupling member is possible.

The male coupling device of the present invention includes a shaft, a handle, a sleeve mounted to move relative to the handle and normally urged away from the handle, a plurality of threaded segments surrounding the shaft, the threaded segments mounted to move inwardly and outwardly to effectively vary the diameter of the assembled threaded elements and an operating mechanism connecting the sleeve and the threaded segments such that movement of the sleeve relative to the handle causes the threaded segments to move inwardly reducing the diameter of the assembled threaded elements permitting the male coupling member to be inserted and withdrawn by rectilinear sliding motion into and from the female coupling member which is provided with conventional threads.

BRIEF DESCRIPTION OF THE DRAWINGS

FIG. 3 is an exploded perspective view of the components of the male coupling member;

FIG. 4 is a perspective view showing one of the movably mounted, threaded elements;

DESCRIPTION OF THE PREFERRED EMBODIMENTS

Figure 1:
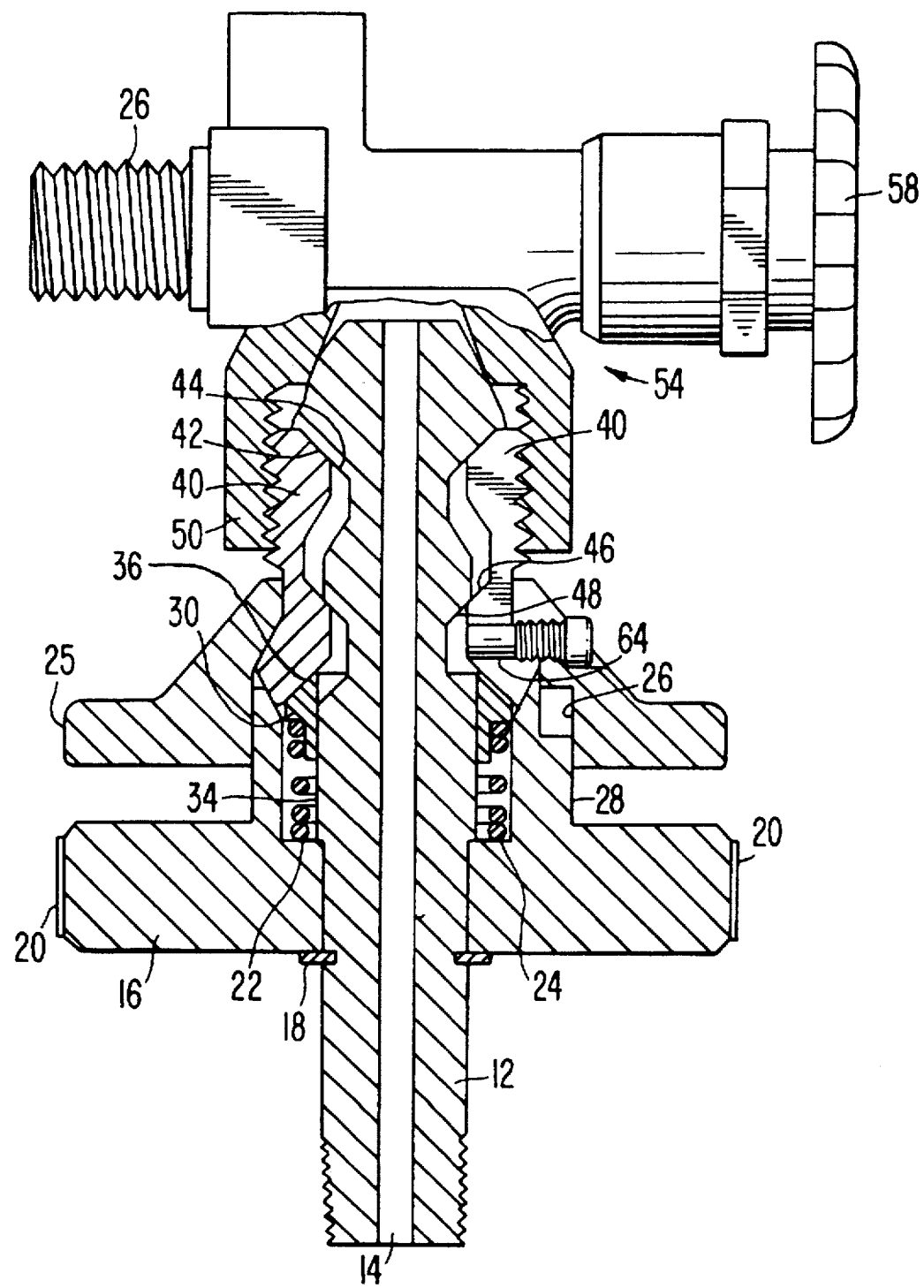
FIG. 1 is a cross-sectional view taken along line A—A of FIG. 5 illustrating the male coupling locked in place within a standard female coupling of a gas valve, at which time the movable, threaded segments are in their outermost position within the stationary threads of the female coupling.

As seen in FIG. 1, the male coupling member generally designated by the reference numeral 10 consists of a shaft 12 provided with an axially oriented passageway 14 through which gas or other fluids pass. It is to be understood, of course, that the passageway 14 is necessary only where gas or other fluid must pass through the male coupling member, as explained in detail hereinafter.

The handle 16 surrounds the shaft 12 and is held in place by the retaining ring 18. Knurling 20 is provided on the outer periphery of the handle 16 to assist in handling same. The handle 16 is also provided with a shoulder 22 providing a supporting surface against which one end of the compression spring 24 rests.

The sleeve 25 surrounds the shaft 12 and is provided with a surface 26 which is aligned with a corresponding surface 28 of the handle 16, thus permitting the handle 16 to be moved in sliding relationship with respect to the sleeve 25.

The spring sleeve 30 also surrounds the shaft 12 and fits within the space between the surface 32 of the handle 16 and the outer surface 34 of the shaft 12. The spring sleeve 30 is provided with a shoulder and a frustoconical surface 36. The other end of the compression spring 24 rests against the shoulder of the spring sleeve 30. It will be apparent that the compression spring 24 normally urges the sleeve 22 and thus the threaded segment 40 away from the handle 16 which abuts the retaining ring 18. Furthermore, as the spring sleeve 30 moves forward, the frustoconical surface 36 pushes on the matching surface of the threaded segments 40 forcing them down and away from the shaft 12. The resulting force keeps the threaded segments 40 aligned with the shaft 12.

Three movably mounted threaded elements 40 are employed in the preferred embodiment. Each of the threaded elements 40 is provided with a frustoconical surface 42 complementary in configuration with respect to the surface 44 of the shaft 12, thus permitting sliding movement of the threaded segments 40 along the planes defined by its surface 42, 44. In like manner each of the threaded segments 40 is provided with a second frustoconical surface 46 aligned with respect to the surface 48 of the shaft 12 permitting sliding movement therealong. Each side of the threaded segments 40 has a slot 41 at one end that permits the pins 62 to be moved by the sleeve into the slot 41 so that the threaded segments 40 can move together.

As seen in FIG. 3 the sleeve 25 is provided with threaded openings 61 into which corresponding pins 62 pass. Each of the pins 62 is provided with a portion having a smooth surface 64 which, as seen in FIGS. 1 and 2, is positioned between each of the threaded segments 40.

FIG. 1 illustrates the position of the male coupling member 10 when locked in place within the female coupling member 52 which may be an integral part of a valve assembly such as that generally designated by the reference numeral 54, and which includes an exit port 56 and a handle 58 for opening and closing the valve (not shown) contained within the assembly 54. The pins 62 are positioned between the segments 40 and both prevent them from collapsing and permit torque to be imparted to them from sleeve 25.

Figure 2:
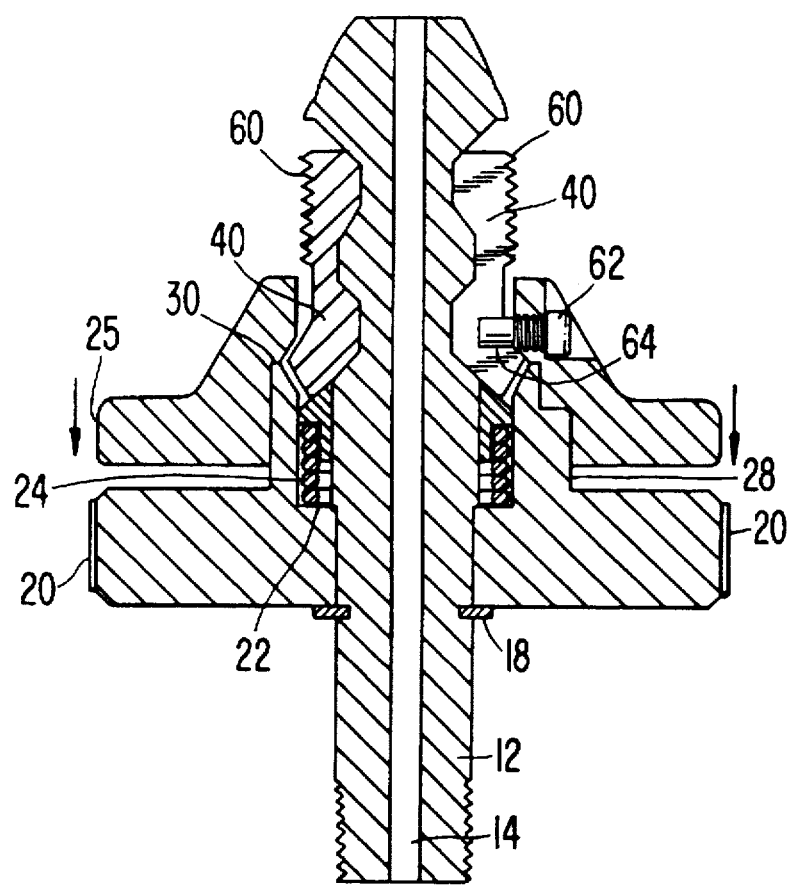
FIG. 2 is a cross-sectional view illustrating the movable, threaded segments in their innermost, retracted position.
Figure 5:
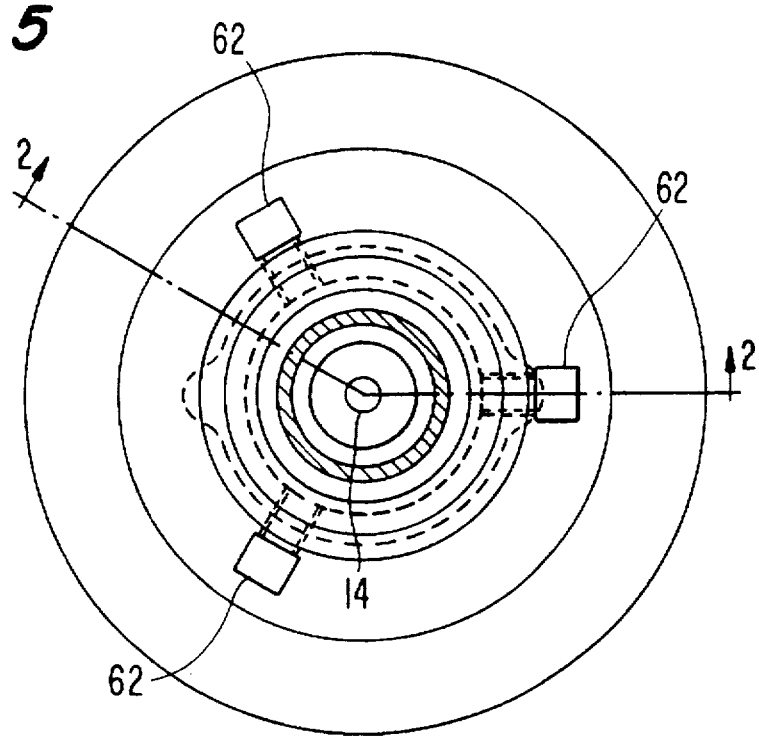
FIG. 5 is a plan view of the male coupling locked in place within the standard female coupling.

When it is desired to remove the male coupling member 10, the sleeve 25 is moved towards the handle 16, as illustrated in FIG. 2, and the male coupling member 10 rotates counter-clockwise a small degree. As this action is taken, the frustoconical surface 50 of each of the threaded segments 40 is moved into engagement with the corresponding frustoconical surface 52 of the handle 16, thus compressing the compression spring 24 while urging each of the threaded segments 40 to move inwardly along the frustoconical surfaces 42, 44 and 46, 48 until the effective diameter defined by the threads 60 of the threaded segments 40 is suitably reduced such that the male coupling member 10 can be removed from the female coupling member 52 by rectilinear, sliding movement. Simultaneously the pins 62 are moved to the gap 41 between the segments 40 thereby permitting them to move inward.

Coupling of the male member 10 to the gas valve assembly 54, as depicted in FIG. 1, will now be described. The sleeve 25 is moved towards the handle 16 in the direction depicted in FIG. 2. This results in retracting inwardly the three threaded segments 40 to their innermost position, as seen in FIG. 2. It is then possible to insert the male coupling member 10 into the female coupling member 52 by sliding movement along a rectilinear path since the teeth 60 of the threaded segments 40 no longer engage the teeth of the female coupling 50. Thereafter, its sleeve 25 is released and the male coupling member briefly rotates clockwise and into locking relationship.

Figure 6:
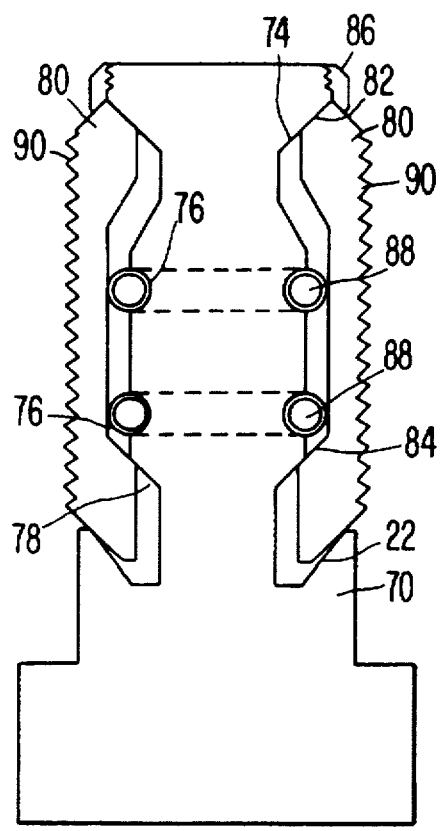
FIG. 6 is a cross-sectional view of a second embodiment of the male coupling permitting locking by rectilinear movement of the male coupling.
Figure 7:
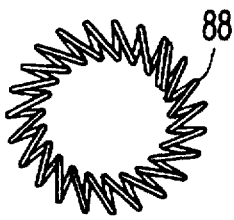
FIG. 7 is a plan view of the radial spring employed in the second embodiment of the male coupling.

In the embodiment previously described, locking and unlocking of the male coupling member by axial movement is achieved. In the embodiment of FIGS. 6-7, which will now be described, there is disclosed a male coupling which permits locking by rectilinear (axial) movement within the female coupling, but wherein unlocking is accomplished by conventional rotating movement of the male coupling within the female coupling.

In FIG. 6 it will be apparent that the shaft 70 is provided with lower and upper frustoconical surfaces 72 and 74, while the mid-section thereof is provided with two circumferential grooves 76 and frustoconical surface 78.

The movably mounted threaded elements are designated generally by the reference numeral 80 and include upper and lower frustoconical surfaces 82 and 84. The ring 86 is threaded to the shaft 70 locking the threaded elements 80 in place.

Radial springs 88, as illustrated in FIG. 7, are positioned within the grooves 76 and are thus interposed between the shaft 70 and the threaded elements 80. The configuration of the springs 88 is depicted in detail in FIG. 7.

As the male coupling is inserted within a female coupling provided with stationary threads, and the shaft 70 moved inwardly by rectilinear, axial movement, the threads 90 engage the corresponding threads (not shown) of the female coupling causing the movably mounted threaded elements 80 to move in a generally radially inward direction during which time the frustoconical surfaces 82 and 84 of the threaded elements 80 slide along the corresponding frustoconical surfaces 74 and 78 of the shaft 70. In this manner the radial springs 88 are compressed between the movably mounted threaded elements 80 and the shaft 70. After the shaft 70 is moved axially into the female coupling the springs 88 cause the movably mounted threaded elements 80 to move radially outward thus ensuring proper engagement between the threads 90 of the movably mounted threaded elements 80 and the corresponding fixed threads (not shown) of the female coupling.

It will be apparent from the embodiment of the invention disclosed in FIGS. 6 and 7 that where it is only necessary to be able to insert the male coupling within the female coupling by rectilinear movement an embodiment of the invention has been disclosed which is characterized by its simplicity and reliability, resulting from minimizing the number of essential parts.

I claim:

1. A male coupling with movable threaded segments, comprising:

a shaft;

a sleeve mounted to move along the shaft;

a plurality of threaded segments surrounding the shaft and mounted to move inwardly and outwardly relative to the shaft to effectively vary the outer diameter of the assembled threaded segments, the sleeve and threaded segments including surfaces adjoining each other such that movement of the sleeve in one direction causes the threaded segments to move inwardly toward the shaft; and a means resiliently urging the threaded segments outward.

2. A male coupling with movable threaded segments, comprising:

a shaft;

a sleeve provided with an opening through which the shaft passes and mounted to move along the shaft;

means normally urging the sleeve forward and aligning the threaded segments;

a plurality of threaded segments surrounding the shaft and mounted to move radially inward and outward relative to the shaft to vary the effective diameter of the assembled threaded segments; and means operatively connecting the sleeve and the threaded segments such that movement of the sleeve in one direction causes the threaded segments to move radially inward effectively reducing the diameter of the assembled threaded segments.

3. A male coupling as in claim 2, wherein the means operatively connecting the sleeve and the threaded segments comprises frustoconical surfaces on the sleeve and threaded segments such that as the sleeve is moved in one direction its frustoconical surface urges the frustoconical surfaces and the threaded segments inwardly toward the shaft.

4. A male coupling device as in claim 2, wherein said means normally urging the sleeve and threaded segments forward comprises a compression spring and a spring sleeve that aligns the threaded segments with the shaft.

5. A male coupling device as in claim 1, wherein said means normally urging the threaded segments outward is at least one coil spring surrounding the shaft and abutting threaded segments.

6. A male coupling as in claim 1, wherein the plurality of threaded segments are three in number.

7. A male coupling as in claim 2, wherein the plurality of threaded segments are three in number.

8. A male coupling as in claim 1, further comprising parallel frustoconical surfaces on the shaft where the angle of the frustoconical surface to the axis is greater than the angle of the thread to the axis mating with corresponding parallel frustoconical surfaces on the threaded segments thus permitting the threaded segments to move inwardly and outwardly in a radial and angled direction relative to the shaft while remaining parallel to the shaft.

9. A male coupling as in claim 2, further comprising parallel frustoconical surfaces on the shaft where the angle of the frustoconical surface to the axis is greater than the angle of the thread to the axis mating with corresponding parallel frustoconical surfaces on the threaded elements thus permitting the threaded elements to move inwardly and outwardly in a radial and angled direction relative to the shaft while remaining parallel to the shaft.

10. A male coupling device as in claim 2, further comprising pins mounted on the sleeve and extending between the threaded segments when expanded, permitting torque to be transferred from the sleeve to the threaded segments and preventing them from moving inward, but moving to a slot when the sleeve is retracted permitting the threaded segments to collapse on the shaft.

11. A male coupling device as in claim 1, further comprising pins mounted on the sleeve and extending between the threaded segments when expanded, permitting torque to be transferred from the sleeve to the threaded segments and preventing them form moving inward, but moving to a slot when the sleeve is retracted permitting the threaded segments to collapse on the shaft.

12. A male coupling with movable threaded segments, comprising:

a shaft having frustoconical surfaces where the angle of the frustoconical surface to the axis is greater than the angle formed by the flank and a perpendicular to the thread axis in an axial plane;

a plurality of threaded segments surrounding the shaft, each of the threaded segments having frustoconical surfaces mating with the frustoconical surfaces of the shaft; and means normally urging the threaded segments away from the shaft.

13. A male coupling as in claim 12, wherein said means normally urging the threaded segments away from the shaft includes at least one coil spring surrounding the shaft and abutting the threaded segments permitting the threaded segments to move inwardly toward the shaft against the force of the spring while normally urging the threaded segments away from the shaft.

14. A male coupling as in claims 1 and 12 wherein said means normally urging the threaded segments away from the shaft is a resilient gasket.

* * * * *